United States Patent

Yokota

[11] Patent Number: 6,104,019
[45] Date of Patent: Aug. 15, 2000

[54] DEVICE FOR AND METHOD OF FOCUS CONTROL, AND INFORMATION REPRODUCTION APPARATUS HAVING THE DEVICE

[75] Inventor: Kazuki Yokota, Kawagoe, Japan

[73] Assignee: Pioneer Electronic Corporation, Tokyo-to, Japan

[21] Appl. No.: 09/060,961

[22] Filed: Apr. 16, 1998

[30] Foreign Application Priority Data

Apr. 16, 1997 [JP] Japan ................................. 9-099267

[51] Int. Cl.$^7$ ........................................ G11B 7/00
[52] U.S. Cl. ................................. 250/201.5; 250/201.4; 250/201.2; 369/94
[58] Field of Search ............................ 250/201.1, 201.2, 250/201.4, 201.5; 369/44.11, 44.25, 44.26, 44.29, 54, 55, 56, 58, 93, 94, 106, 119, 283, 284, 286

[56] References Cited

U.S. PATENT DOCUMENTS

| | | | |
|---|---|---|---|
| 5,449,590 | 9/1995 | Imaino et al. | 430/273 |
| 5,644,555 | 7/1997 | McDaniel et al. | 369/13 |
| 5,682,372 | 10/1997 | Yamakawa et al. | 369/94 |
| 5,745,461 | 4/1998 | Kawasaki | 369/58 |
| 5,974,009 | 10/1999 | Tamura et al. | 369/44.29 |

*Primary Examiner*—John R Lee
*Attorney, Agent, or Firm*—Morgan, Lewis & Bockius LLP

[57] ABSTRACT

The first detection unit detects a focus search state in which focus search is required. The second detection unit detects one of the plurality of layers currently being accessed, i.e., information is being recorded or reproduced. Then, the focus search unit moves a light beam relative to the plurality of layers to obtain a focused state of the light beam on a desired one of the plurality of layers when the first detection unit detects the focus search state. Importantly, the focus search unit moves the light beam from one side of two surfaces of the storage medium, which is closer to the layer detected by the second detection unit, to the other side of the two surfaces of the storage medium. Therefore, the focus search can be quickly completed, and hence the reproduction of information can also be performed quickly.

9 Claims, 3 Drawing Sheets

DEVICE FOR AND METHOD OF FOCUS CONTROL, AND INFORMATION REPRODUCTION APPARATUS HAVING THE DEVICE

BACKGROUND OF THE INVENTION

1. Field of the Invention

The present invention relates to an information storage medium such as a multi-layer optical disc including Compact Disc, Compact Disc-Recordable, DVD, DVD-Recordable, DVD-RAM, etc., on and from which information is recorded and reproduced. More specifically, the present invention relates to the focus servo control technique for focusing the light beam on the respective layers of the multi-layer optical disc (so-called "focus search").

2. Description of the Prior Art

Recently, there are known a multi-layer information storage medium having multiple recording layers and an information recording/reproducing apparatus for recording and/or reproducing information on and/or from the multi-layer storage medium. Such information recording/reproducing apparatus is provided with an optical pickup generally including a laser diode for emitting a light beam, a polarization beam splitter, an objective lens and photodetectors. At the time of reproducing information, the optical pickup emits the light beam and receives the reflected light from the optical disc to reproduce recorded information. At the time of recording information, the apparatus modulates the light beam by the information to be recorded, and then irradiates the light beam thus modulated on the storage medium to record information.

When irradiating the light beam on the storage medium, it is necessary to focus the light beam on the recording surface of the optical disc (so-called "focus search") and then constantly maintain the focused state of the light beam on the layer of the storage medium (so-called "focus servo control"). The conventional information reproduction apparatus generally moves the objective lens vertically in relation to the layer of the optical disc to execute the focus search and the focus servo control. The focus search is also required to restore the focused state of the light beam and restart the focus servo control when the focused state is lost (i.e., out-of-focus state).

In recording and/or reproducing information on and/or from the multi-layer optical disc, the focus search should be performed to detect a certain target layer with which the recording and/or the reproduction is carried out. In such case, the conventional apparatus first moves the light beam, and accordingly moves the focal point of the light beam, toward the position of the pickup beyond the layer of the disc closest to the optical pickup, and subsequently starts the focus search from one side of the disc near to the pickup to the other side of the disc remote from the pickup. Specifically, the focal point is temporarily moved toward the pickup beyond the layer of the disc closest to the pickup so that the focal point is positioned out of the optical disc. Subsequently, the objective lens is moved remotely from the pickup so that the focal point passes through the respective layers of the disc and the so-called "S-curves" in the focus error signal is detected and counted, thereby permitting the focal point to be positioned on the target layer.

In this method, however, the detection of the target layer may sometimes take relatively long period of time. Namely, assuming that the focused condition is lost during the reproduction of the fifth layer of the 6-layered disc, the pickup is temporarily moved to the original position and then moved toward the disc until the fifth S-curve, corresponding to the fifth layer, is detected. Namely, the focal point of the light beam is once moved out of the disc and then moved to traverse four layers before reaching the fifth layer. In this way, the movement of the pickup is relatively large, particularly for the disc having large number of layers, and the time required to restore the focused state is necessarily relatively long.

SUMMARY OF THE INVENTION

It is an object of the present invention to provide a focus servo control device, with which the focus search in the multi-layer storage medium can be quickly completed.

It is another object of the present invention to provide a method for the focus servo control, using the above focus servo control device.

According to one aspect of the present invention, there is provided a focus control device for performing focus servo control with respect to an information storage medium having a plurality of layers, including: a first detection unit for detecting a focus search state in which focus search is required; a second detection unit for detecting one of the plurality of layers currently being accessed; and a focus search unit for moving a light beam relative to the plurality of layers to obtain a focused state of the light beam on a desired one of the plurality of layers when the first detection unit detects the focus search state, wherein the focus search unit moves the light beam from one side of two surfaces of the storage medium, which is closer to the layer detected by the second detection unit, to the other side of the two surfaces of the storage medium.

In accordance with the device thus configured, the first detection unit detects a focus search state in which focus search is required. The second detection unit detects one of the plurality of layers currently being accessed, i.e., information is being recorded or reproduced. Then, the focus search unit moves a light beam relative to the plurality of layers to obtain a focused state of the light beam on a desired one of the plurality of layers when the first detection unit detects the focus search state. Importantly, the focus search unit moves the light beam from one side of two surfaces of the storage medium, which is closer to the layer detected by the second detection unit, to the other side of the two surfaces of the storage medium. Therefore, the focus search can be quickly completed because the distance of the pickup movement is shortened, and hence the reproduction of information can also be performed quickly.

The focus search unit may include: an S-curve detection unit for detecting an S-curve in a focus error signal; and a determination unit for determining the focused state when the S-curve detection unit detects the S-curve corresponding to the desired one of the layers. By this, the focus search can be readily performed by detecting the S-curves in the focus error signal, and the system configuration can also be simplified.

The focus search unit may further include a counter for counting a number of the S-curves to detect the S-curve corresponding to the desired one of the layer. Further, the focus search unit may include: a memory for storing a total number of the layers of the storage medium and an identification information of the layer detected by the second detection unit; and a controller for controlling the movement of the light beam relative to the layers based on the total number and the identification information stored in the memory. Still further, the focus search unit may further include a unit for moving the light beam to traverse the layers to detect a total number of the layers of the storage medium prior to recording and/or reproduction of information on and/from the storage medium.

In one embodiment, the first detection unit may detect the focus search state when the light beam becomes out-of-focus with respect to the layer. In another embodiment, the first detection unit may detect the focus search state when a focus search instruction is inputted.

According to another aspect of the present invention, there is provided an information reproduction apparatus including: the focus servo device described above; a beam irradiation unit for irradiating a light beam on the storage medium; a beam receiving unit for receiving the light beam reflected by the storage medium to produce a light reception signal; and a reproduction unit for applying a signal processing onto the light reception signal to output a reproduction signal.

According to still another aspect of the present invention, there is provided a focus control method for performing focus servo control with respect to an information storage medium having a plurality of layers, including the steps of: detecting a focus search state in which focus search is required; detecting one of the plurality of layers currently being accessed; and moving a light beam relative to the plurality of layers to obtain a focused state of the light beam on a desired one of the plurality of layers when the focus search state is detected, wherein the moving step moves the light beam from one side of two surfaces of the storage medium, which is closer to the layer detected by the second detection unit, to the other side of the two surfaces of the storage medium.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENT

The preferred embodiment of the present invention will now be described below with reference to the attached drawings.

Figure 1:
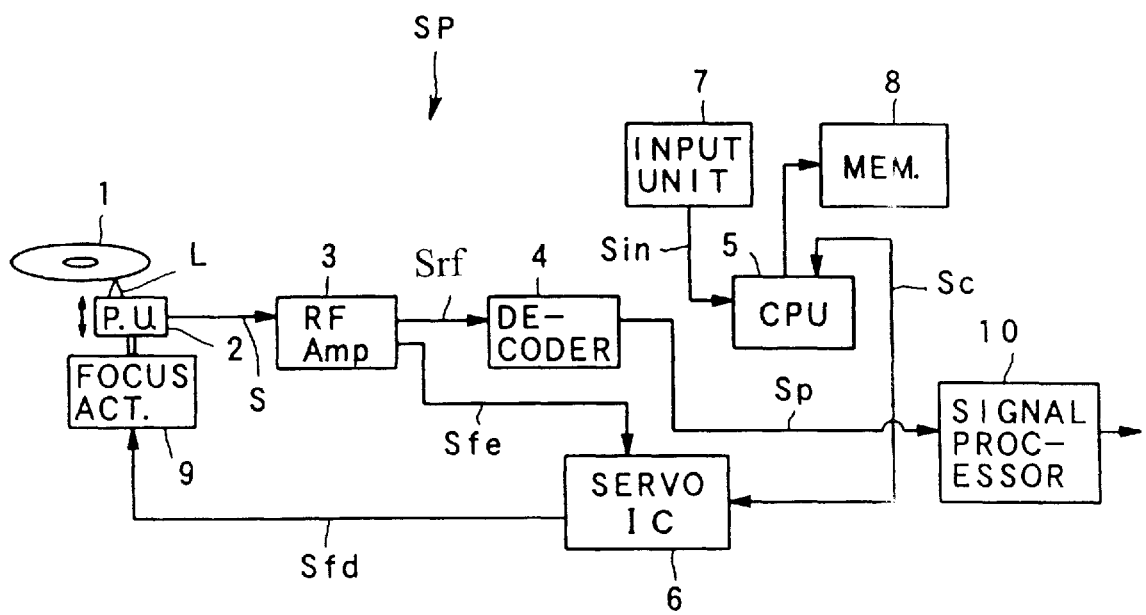
FIG. 1 is a block diagram illustrating the schematic configuration of the information reproduction apparatus according to the present invention.

First, the description will be given of the configuration of the information reproduction apparatus according to the present invention with reference to FIG. 1. As shown in FIG. 1, the information reproduction apparatus SP includes the optical pickup 2, the RF amplifier 3, the decoder 4, the CPU 5, the serve IC 6, the input unit 7, the memory 8, the focus actuator 9 and the signal processor unit 10. The optical pickup 2 includes an objective lens R (shown in FIG. 2) for converging the light beam L onto one of the layers of the optical disc 1 and a cylindrical lens (not shown) for giving an astigmatism to the reflected light from the optical disc 1.

The optical pickup 2 irradiates the light beam L onto the optical disc 1 and receives the reflected version of the light beam L from the optical disc 1 to convert it to an electric signal S. The RF amplifier 3 produces the focus error signal Sfe and the RF signal Srf from the electric signal S supplied from the optical pickup 2, and then amplifies those signals. The decoder 4 decodes the amplified RF signal Srf to produce the reproduction signal Sp corresponding to the recorded information, and supplies it to the signal processor unit 10. The servo IC 6 produces the focus drive signal Sfd and carries out the focus servo control for the light beam L. The CPU 5 communicates with the servo IC 6 using the control signal Sc to control the focus servo operation by the servo IC 6. In addition, the CPU 5 performs total control of the information reproduction apparatus SP. The input unit 7 is used to input necessary information to the CPU 5, and the memory 8 temporarily stores certain information necessary for the control processing, including the focus servo control by the CPU 5. The focus actuator 9 drives the objective lens in the optical pickup 2 in the vertical direction towards the optical disc 1 based on the focus drive signal Sfd. The signal processor unit 10 applies necessary processing onto the reproduction signal Sp and outputs the resultant signal to an external unit.

Figure 2:
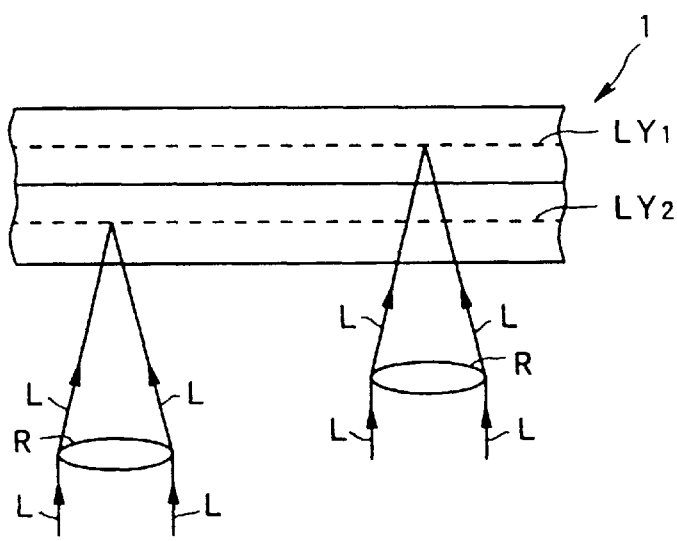
FIG. 2 is a sectional view of the multi-layer optical disc used in the present invention.

FIG. 2 shows the vertical section of the optical disc 1 shown in FIG. 1. The optical disc 1 includes the first layer $LY_1$ and the second layer $LY_2$, each carrying different information in the form of the recording pits formed thereon. The optical disc 1 is irradiated with the light beam L for reproducing the recorded information from the lower surface side of the disc 1. The focus actuator 9 controls the position of the objective lens R relative to the optical disc 1 such that the light beam L is converged on the first layer $LY_1$ to reproduce information therefrom. Similarly, the focus actuator 9 controls the position of the objective lens R relative to the optical disc 1 such that the light beam L is converged on the second layer $LY_2$ to reproduce information therefrom. In the following description, the surface of the disc on the side of the pickup (i.e., the lower surface of the optical disc 1 in this example) on which the light beam is irradiated will be referred to as "beam irradiation surface", and the opposite surface (i.e., the upper surface of the optical disc 1 in this example) on which the light beam is not irradiated will be referred to as "beam non-irradiation surface".

Figure 3:
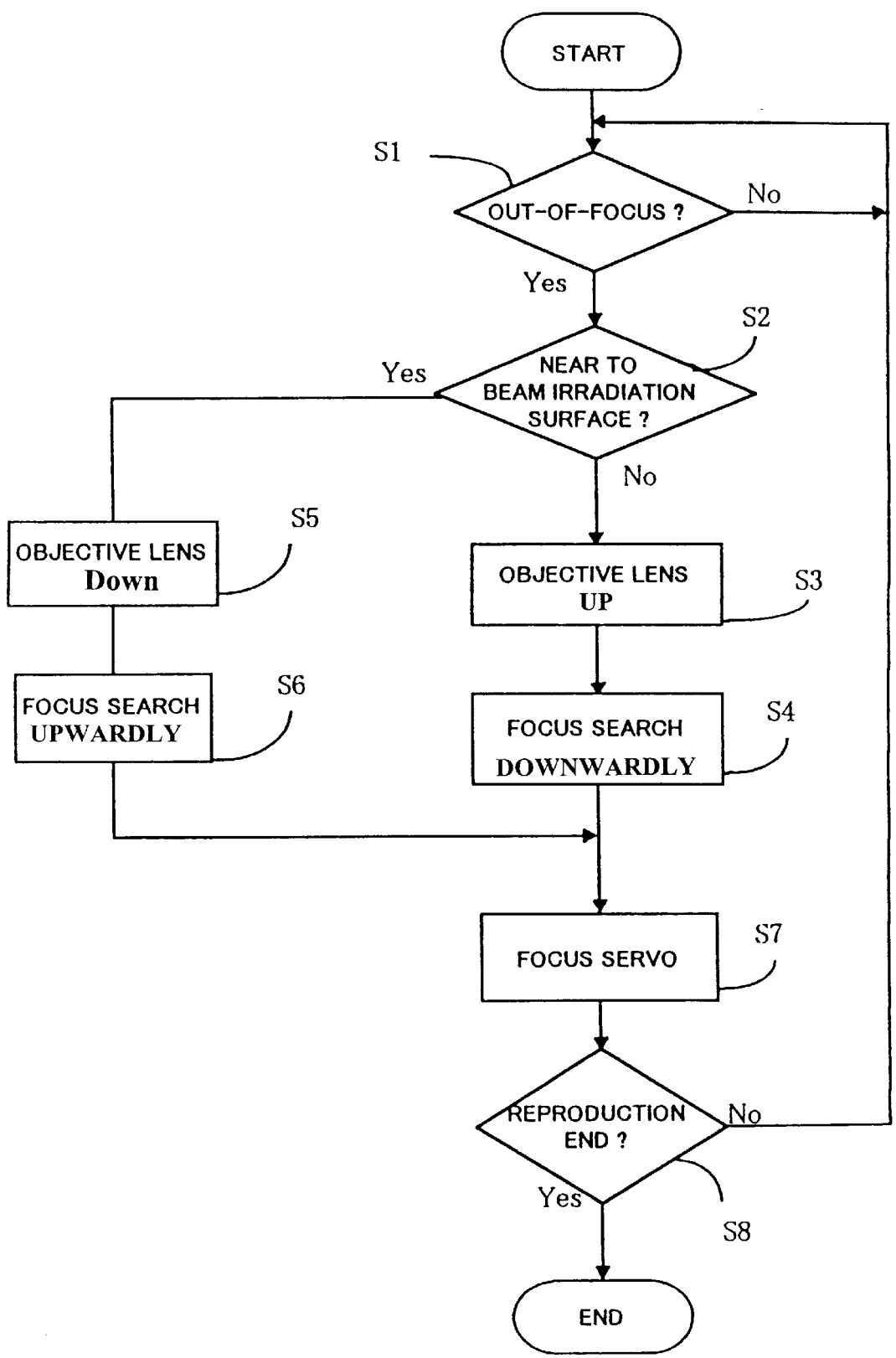
FIG. 3 is a flowchart illustrating the focus servo control according to the present invention.
Figure 4A:
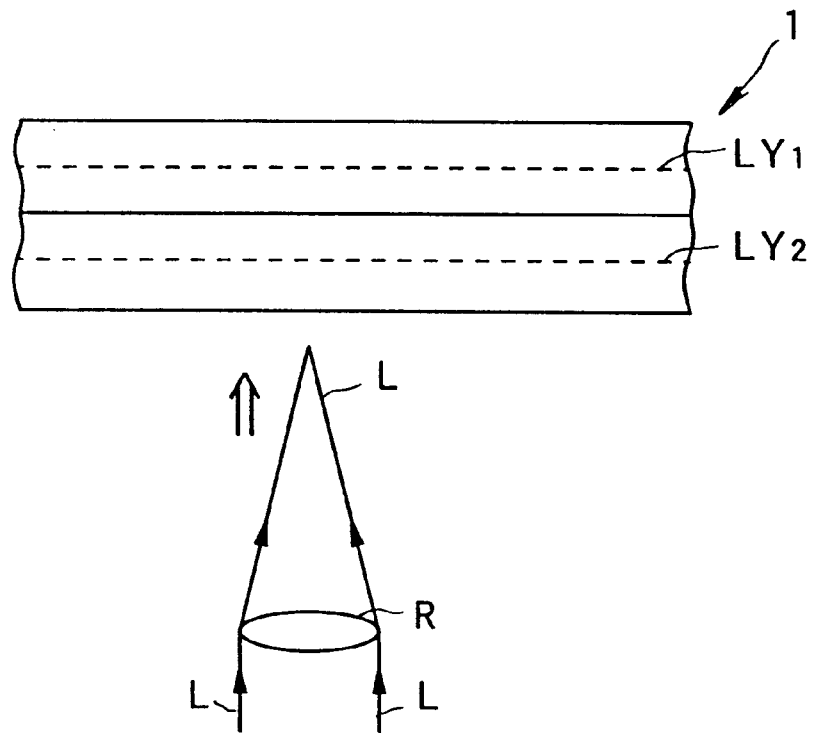
FIGS. 4A and 4B are the schematic diagrams illustrating the focus search operation according to the present invention.
Figure 4B:
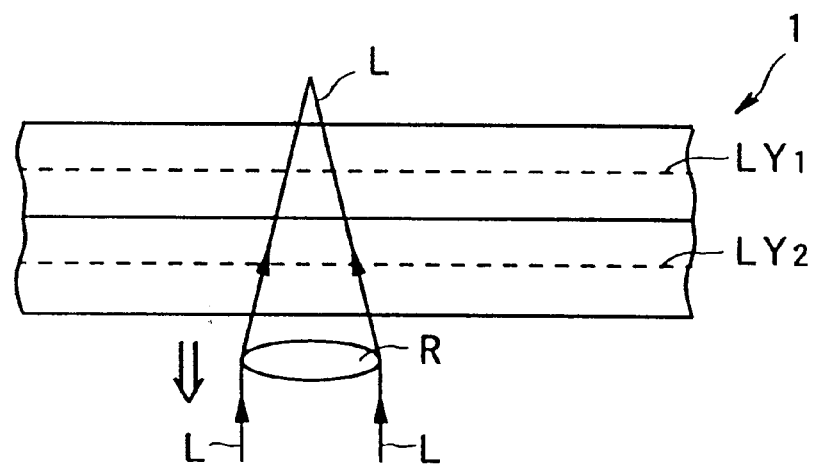

Next, the focus servo control according to the present invention will be described with reference to FIGS. 3, 4A and 4B. Here, it is assumed that the total number of the layers of the optical disc 1 ("2" in the example of the optical disc shown in FIG. 2) is inputted, in advance, from the input unit 7 to make the CPU 5 know the total number. Alternatively, the total number of layers in the optical disc 1 may be recorded on the optical disc 1 at the innermost circumferential area thereof so that the CPU 5 can read it to know the total number of the layers of the disc prior to the start of the reproduction. Also, it is noted that the CPU 5 always recognizes which one of the plural layers is being accessed (i.e., read or written), and memorizes such information in the memory 8, so as to control the servo IC 6.

In the focus servo control, first of all, it is determined whether or not the out-of-focus state takes place (step S1). Here, the "out-of-focus state" means such a situation that the focal point of the light beam L is displaced from the surface of the layers of the optical disc due to the external vibration or the like. If No, the reproduction of the recorded information is continued. If the out-of-focus state takes place (step S1; Yes), then it is determined whether or not the layer being accessed prior to the detection of the out-of-focus state is nearer to the beam irradiation surface than to the beam non-irradiation surface (step S2). In step S2, the CPU 5 makes determination based on the total number of the layer of the optical disc 1 and the identification of the layer from which the recorded information is currently read out. It is noted that the CPU 5 always recognizes which one of the layers is being accessed. Specifically, if the out-of-focus state takes place during the reproduction of the first layer $LY_1$, the CPU 5 determines that the layer currently being reproduced is near to the beam non-irradiation surface. On the contrary, if the out-of-focus state takes place during the reproduction of the second layer $LY_2$, the CPU 5 determines that the layer currently being reproduced is near to the beam irradiation surface.

If step S2 results in Yes, the objective lens R is temporarily moved downwardly to the lower surface side of the optical disc 1 to the position below the second layer $LY_2$ (step S5). Then, the servo IC performs, under the control by the CPU 5, the focus search upwardly from the position (i.e., in the direction toward the beam non-irradiation surface) on the basis of the total number of the layer and the identification of the layer currently being accessed (step S6, see. FIG. 4A). This focus search counts the number of the S-curves (the S-shape portions in the focus error signal Sfe observed when the focal point of the light beam L passes through the layers), which appear in the focus error signal Sfe during the upward movement of the light beam L, to detect the position of the layer to which the light beam to be focused. In this embodiment, if the out-of-focus state takes place during the reproduction of the second layer $LY_2$, the focus search in step S6 is terminated when the initial S-curve corresponding to the layer $LY_2$ is detected. After the layer to be focused is detected in step S6, the focus servo control is resumed from the detected position (step S7). Subsequently, it is determined whether or not the reproduction is completed (step S8). If Yes, the process ends. If No, the process returns to step S1 to repeat the process.

On the other hand, if step S2 results in No, the objective lens R is temporarily moved upwardly to the upper surface side of the optical disc 1 to the position above the first layer $LY_1$ (step S3). Then, the servo IC performs, similarly to step S6, the focus search downwardly from the position on the basis of the total number of the layer and the identification of the layer being accessed (step S4, see. FIG. 4B). This focus search counts the number of the S-curves, which appear in the focus error signal Sfe during the downward movement of the light beam L, to detect the position of the layer to which the light beam to be focused. In this embodiment, if the out-of-focus state takes place during the reproduction of the first layer $LY_1$, the focus search in step S4 is terminated when the initial S-curve corresponding to the layer $LY_1$ is detected. When the layer to be focused is detected in step S4, the focus servo is resumed from the detected position (step S7). Thereafter, step S8 described above is executed.

As described above, according to information reproduction apparatus of the present invention, the focus search is started from the side of one of the beam irradiation surface and the beam non-irradiation surface, which is nearer to the layer being currently accessed. Therefore, the time period necessary for the completion of the focus search may be shortened. For example, in the case of DVD recently broadly known, the focus search for one layer requires approximately 1.5 msec. Therefore, as compared with the case where the focus search is made from the remote surface side, the focus search time is reduced for 1.5 msec. Further, since the focus search for each layer is started when the out-of-focus state takes place, it is possible to quickly complete the focus search to resume focus servo control. Still further, since the focus search is made by moving the objective lens R in the vertical direction relative to the layers, the focus search can be performed with simple configuration. Still further, as a result of the acceleration of the focus search, information reproduction may be quickly made.

In the above described embodiment, the CPU 5 recognizes the total number of the layers of the optical disc 1 through the input to the input unit 7 by the operator. Alternatively, the total number of the layer may be checked, in advance of the actual recording and/or reproduction of the optical disc 1, by moving the objective lens R in the vertical direction to detect the number of the layers as the number of the S-curves. By this, the total number of the layers may be accurately recognized by actually detecting the number in the form of the S-curves, and hence erroneous input by human being may be avoided.

In the above embodiment, the focus search is made when the out-of-focus state takes place. However, the focus search according to the present invention may be performed upon the arbitrary instruction for changing the layer, inputted to the input unit 7 as the signal Sin, by the operator. Further, the focus search may be performed at the time of the necessary movement of the information recording and/or reading position from one layer to another during the reproduction. Still further, the focus search may be performed at the time of recording information onto the optical disc. Namely, the information recording apparatus employing the focus search function of the present invention may detect the appropriate recording position on one of the plural layers of the optical disc to record information thereon. In this case, the pickup irradiates the light beam L which is modulated by the information to be recorded.

The present invention is applicable to the recording and/or reproduction of the optical disc having more than two layers. For example, if the out-of-focus state takes place during the access to the fourth layer (from the beam irradiation surface side) of the optical disc having five layers in total, the focal point of the light beam is moved beyond the layer closest to the beam non-irradiation surface to a certain position (including the position out of the optical disc), and then the focus search is started therefrom to toward the beam irradiation surface, thereby returning to the fourth layer of the disc. On the other hand, if the out-of-focus state takes place at the second layer (from the beam irradiation surface side) of the optical disc having five layers in total, the focal point of the light beam is moved beyond the layer closest to the beam irradiation surface to a certain position (including the position out of the optical disc), and then the focus search is started therefrom to toward the beam non-irradiation surface, thereby returning to the second layer of the disc. In this way, the more layers the optical disc has, the greater the reduction in time of the focus search may be.

The above described embodiment is directed to recording and/or reproduction of information on and/or from the optical disc. However, the present invention is applicable to an information storage medium of other type, such as a tape-shaped storage medium, on which information recording/reproduction is made using the light beam.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which

What is claimed is:

1. A focus control device for performing focus servo control with respect to an information storage medium having an upper surface, a lower surface opposing to the upper surface and a plurality of layers disposed between the upper surface and the lower surface, comprising:

a first detection unit for detecting a need for a focus search operation;

a second detection unit for detecting one of the plurality of layers currently being accessed; and a focus search unit for moving a light beam relative to the plurality of layers to obtain a focused state of the light beam on a desired one of the plurality of layers when said first detection unit detects the need for the focus search operation, wherein said focus search unit moves the light beam from one of the upper surface and the lower surface, which is closer to the layer detected by the second detection unit, to the other one of the upper surface and the lower surface.

2. The focus control device according to claim 1, wherein said focus search unit comprises:

an S-curve detection unit for detecting an S-curve in a focus error signal; and a determination unit for determining the focused state when said S-curve detection unit detects the S-curve corresponding to the desired one of the plurality of layers.

3. The focus control device according to claim 2, wherein said focus search unit further comprises a counter for counting a number of the S-curves to detect the S-curve corresponding to the desired one of the plurality of layers.

4. The focus control device according to claim 1, wherein said focus search unit comprises:

a memory for storing a total number of the plurality of layers of the storage medium and an identification information of the layer detected by said second detection unit; and a controller for controlling a movement of the light beam relative to the layers based on the total number and the identification information stored in the memory.

5. The focus control device according to claim 4, wherein said focus search unit further comprises a unit for moving the light beam to traverse the layers to detect the total number of the plurality of layers of the storage medium prior to recording and/or reproduction of information on and/from the storage medium.

6. The focus control device according to claim 1, wherein said first detection unit detects the need for the focus search operation when the light beam becomes out-of-focus with respect to said one of the plurality of layers currently being accessed.

7. The focus control device according to claim 1, wherein said first detection unit detects the need for the focus search operation when a focus search instruction is inputted.

8. An information reproduction apparatus for reproducing information recorded on an information storage medium having an upper surface, a lower surface, and a plurality of layers disposed between the upper surface and the lower surface, comprising:

a focus servo control device including a first detection unit for detecting a need for a focus search operation, a second detection unit for detecting an accessed layer which is currently being accessed, and a focus search unit for moving a light beam relative to the plurality of layers to obtain a focused state of the light beam on a desired layer when said first detection unit detects the need for the focus search operation, wherein said focus search unit moves the light beam from one of the upper surface and the lower surface, which is closer to the accessed layer, to the other one of the upper surface and the lower surface;

a beam irradiation unit for irradiating the light beam on the storage medium;

a beam receiving unit for receiving the light beam reflected by the storage medium to produce a light reception signal; and a reproduction unit for processing the light reception signal and generating a reproduction signal.

9. A focus control method for performing focus servo control with respect to an information storage medium having an upper surface, a lower surface opposing to the upper surface and a plurality of layers disposed between the upper surface and the lower surface, comprising the steps of:

detecting a need for a focus search operation;

detecting one of the plurality of layers currently being accessed; and moving a light beam relative to the plurality of layers to obtain a focused state of the light beam on a desired one of the plurality of layers when the need for the focus search operation is detected, wherein said moving step moves the light beam from one of the upper surface and the lower surface, which is closer to said one of the plurality of layers currently being accessed, to the other one of the upper surface and the lower surface.

* * * * *